May 27, 1941.  H. D. BOLTON  2,243,326

THERMOMETER

Filed May 10, 1940

INVENTOR.
HARRY D. BOLTON
BY
ATTORNEY.

Patented May 27, 1941

2,243,326

UNITED STATES PATENT OFFICE 2,243,326

THERMOMETER

Harry D. Bolton, Rochester, N. Y., assignor to Taylor Instrument Companies, Rochester, N. Y., a corporation of New York Application May 10, 1940, Serial No. 334,420

2 Claims. (Cl. 73—376)

This invention relates to thermometers and more particularly to thermometers of the glass type.

Where wooden back thermometers are to be used in moist places, it is important that the protective or painted covering of the wood shall not be broken by screws or nails, since otherwise the wood will tend to split when subjected to alternating conditions of dryness and moisture.

In my prior Patent No. 1,942,506, granted January 9, 1934, there are disclosed clasps for fastening a thermometer stem to a wooden thermometer support. The present invention, however, has for its purpose the production of a novel bulb guard for use on such a wooden support.

The main feature of the invention relates to a novel thermometer bulb guard which obviates the need of screws or nails for fastening the guard on a thermometer support and yet the guard is of simple construction and readily mounted on the thermometer support wherein it is secured against accidental displacement.

Figure 1:
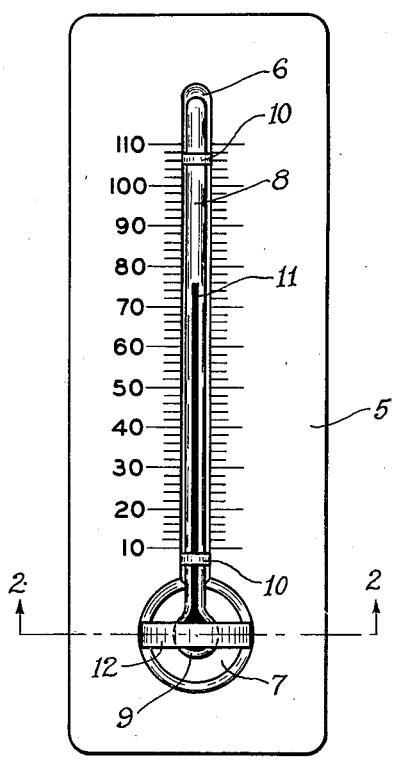
Figure 2:
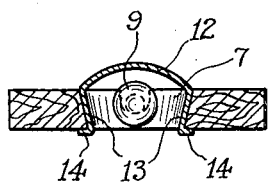

The invention will best be understood by reference to the drawing in which Fig. 1 is a front elevation of a preferred form of the invention and Fig. 2 is a cross sectional view taken substantially on the line 2—2 of Fig. 1.

The thermometer of the present invention includes a thermometer back or support 5 in the form of a strip of wood or other suitable material. The support is provided in one face thereof with a longitudinal channel or recess 6 terminating in a perforation 7 extending from the front to the rear surface of the support. The recess 6 is of a size to receive a stem 8 of a glass thermometer tube, the bulb 9 of which extends into the aperture 7. In the present instance the bulb 9 of the thermometer projects slightly above the front surface of the support 5 (Fig. 2), although the invention is not so limited. The thermometer stem is secured on the support by any suitable form of clasps 10, preferably of the type disclosed in the mentioned patent. The front or recessed surface of the thermometer support 5, is graduated in degrees of temperature, adjacent the indicating path of the thermosensitive liquid 11 in the thermometer stem and bulb.

In order to protect the bulb of the thermometer against breakage, a bulb guard 12 is mounted on the thermometer support. This guard is so shaped that it can be snapped into position on the support and yet be held securely thereon against accidental displacement. It will be noted that the aperture 7 through the support has a tapered or beveled wall, while the bulb guard 12, which is generally U-shaped, has legs 13 shaped to conform to the beveled wall of the aperture 7. The free ends of these legs are provided with angular lugs 14 which engage the rear surface of the support.

In assembling the thermometer, the normally exposed surface of the guard, that is, the closed end thereof, is forced through the aperture from the rear surface of the thermometer support and when thus sprung into position, the resilience of the guard will cause the legs 13 to engage the tapered side wall of the aperture, while the lugs 14 will engage the rear face of the thermometer support to retain the guard in the aperture. Thus the guard is securely locked in position. It will be noted that no screws, pins or external fastening means which pierce the support, are required. Consequently the present construction is well adapted for use as a bath thermometer made of wood or like material, since the paint or the protecting covering of the support is not pierced by the guard fastening means and therefore there is much less danger of the support splitting during use.

Although the bulb 9 has been shown as projecting into the perforation 7, the invention also includes the arrangement where the bulb 9 is superimposed over this perforation.

I claim:

1. In a thermometer, a thermometer support having an aperture therethrough defined by a tapered side wall, a thermometer stem and bulb mounted on said support with said bulb registering with said aperture, a bulb guard extending across said aperture, said guard having legs conforming to the taper of the side wall of the aperture and frictionally engaging said side wall whereby said guard is locked against movement in one direction through said aperture, and means locking said guard against movement in the opposite direction through said aperture.

2. In a thermometer, a thermometer support having an aperture therethrough defined by a tapered side wall, a thermometer stem and bulb mounted adjacent the front surface of said support with said bulb registering with said aperture, and a bulb guard extending across said aperture adjacent the front surface of said support, said guard having legs conforming to the taper of the side wall of the aperture and frictionally engaging said side wall, said legs having free ends provided with lugs engaging the rear surface of said support.

HARRY D. BOLTON.